(12) United States Patent
Tan

(10) Patent No.: US 8,756,658 B2
(45) Date of Patent: Jun. 17, 2014

(54) NODE AUTHENTICATION

(75) Inventor: Zhenhua Tan, Shenyang (CN)

(73) Assignee: Northeastern University Technology Transfer Center, Liaoning (CN)

( * ) Notice: Subject to any disclaimer, the term of this patent is extended or adjusted under 35 U.S.C. 154(b) by 682 days.

(21) Appl. No.: 12/813,724

(22) Filed: Jun. 11, 2010

(65) Prior Publication Data
US 2011/0277014 A1 Nov. 10, 2011

(30) Foreign Application Priority Data
May 10, 2010 (CN) .......................... 2010 1 0176264

(51) Int. Cl.
G06F 7/04 (2006.01)
(52) U.S. Cl.
USPC ............................................................. 726/3
(58) Field of Classification Search
USPC ............................................................. 726/3
See application file for complete search history.

(56) References Cited

U.S. PATENT DOCUMENTS

| 7,275,102 | B2 * | 9/2007 | Yeager et al. | 709/224 |
|---|---|---|---|---|
| 2004/0181607 | A1 | 9/2004 | Xu et al. | |
| 2008/0019291 | A1 | 1/2008 | Sienel et al. | |
| 2009/0133034 | A1 * | 5/2009 | Hazeur | 719/313 |
| 2010/0281521 | A1 * | 11/2010 | Sakakihara et al. | 726/3 |

OTHER PUBLICATIONS

Ion Stoica, et al "Chord: A Scalable Peer-to-peer Lookup Protocol for Internet Applications" IEEE/ACM Transactions on Networking, 2003, 11(1):17-32.
Zhenhua Tan, et al "A Three-layer Routing Protocol of Structured Peer-to-Peer Overlay Networks" Proceedings of the 5th International Conference on Visual Information Engineering (VIE 2008) London: Institution of Engineering and Technology, London, 2008:449-452.
Tan Z H, Cheng W, Chang GR, et al., "A Three-layer Routing Protocol of Structured Peer-to-Peer Overlay Networks," Proceedings of the 5th International Conference on Visual Information Engineering (VIE 2008). London: Institution of Engineering and Technology,London, 2008: pp. 449-452.

* cited by examiner

*Primary Examiner* — Kambiz Zand
*Assistant Examiner* — Aubrey Wyszynski
(74) *Attorney, Agent, or Firm* — Maschoff Brennan

(57) ABSTRACT

A requester node requesting a service in a peer-to-peer network transmits a request to a service provider node. The request may include a communication history of the requester node identifying other nodes with which the requester node has previously communicated. The service provider node authenticates the requester node based on the communication history. The service provider node may ask other nodes with which the requester node has communicated for evaluation of the requester node. The other nodes may calculate a trust metric of the requester node and provide this metric to the service provider node. The service provider node may use this trust metric in combination with a similarity calculation of the requester node and the service provider node to make a determination whether the requester node is to be authenticated. The service provider node may evaluate the requester node and store the evaluation in its communication history.

14 Claims, 8 Drawing Sheets

NODE AUTHENTICATION

BACKGROUND OF THE INVENTION

Communication nodes are often interconnected through networks. Peer-to-peer networks include communication nodes communicating with other communication nodes. The nodes may communicate with each other, share information, provide services, and perform other network interactions. Peer-to-peer networks may be decentralized, without a central network authority. Thus, communication nodes in a peer-to-peer network may be thought of as peers or equals. Authentication in a peer-to-peer network helps ensure that content communication between nodes in the network is safer.

In a peer-to-peer network one node can share information with another node. For example, node A as a service provider can share locally stored information or data such as video, audio, and the like, with node B. Node B can then download/transfer the information/data from node A. In a situation where no authentication mechanism is provided, many undesirable situations may arise. For example, some nodes may only obtain services and provide no services themselves, some nodes may provide malicious services, some nodes may undermine resources on other nodes, and some malicious nodes may act as a group to cheat other nodes.

SUMMARY

In an embodiment, an authentication method may include receiving at a first node a request for a service from a second node. Further, the authentication method may include determining whether the second node is authenticated based on a communication history of the second node included in the request for the service. Further, the method may include providing the service to the second node when the determining indicates that the second node is authenticated.

In an alternative embodiment, an authentication method is disclosed that may include a first node requesting a service from a second node and including as authentication credentials a communication history in the request for service. The authentication method may also include receiving the requested service from the second node based on the authentication credentials.

In an alternative embodiment, an authentication method is disclosed and may include receiving a request for a communication history between a peer node and a first node. The method may also include evaluating the trustworthiness of the first node based on the communication history, and transmitting the communication history and the evaluation of the trustworthiness of the first node.

In an alternative embodiment, an apparatus may include an authentication module configured to receive a request for a service, and a service module configured to provide the requested service to a requester apparatus, based on authentication performed by the authentication module.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
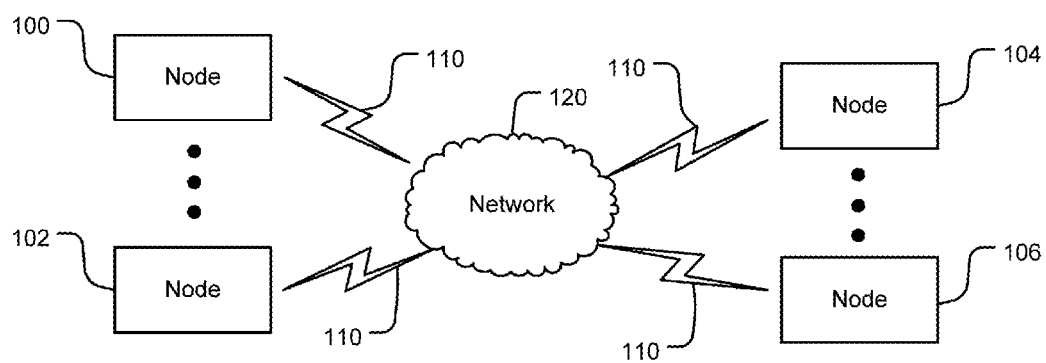
FIG. 1 is an example of a peer-to-peer network environment, according to an example embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, systems and computer programs for node authentication. In a peer-to-peer network communication nodes communicate with each other. Because peer-to-peer networks may be decentralized, without a central network authority, the communication nodes are thought of as peers, and as such may not have a central authority to rely on when authenticating other peer nodes. Communication nodes in a peer-to-peer network may be functionally equivalent to each other, but may behave differently based on the role they are performing. A node that requests a service is performing the role of a service requester node. A node that provides the requested service is performing the role of a service provider node. A node that provides an evaluation of another node is performing the role of a peer evaluator node. Thus, any node in the peer-to-peer network may at various times perform various functions. For example, a first node may request a service from a second node, thus performing the role of a service requester. In that particular interaction, the second node performs the role of a service provider. It may be appreciated by one skilled in the art that the roles between the nodes may be reversed. When a requester node requests a service from a service provider node, the service provider node can consider the communication history of the requester node to determine based on the communication history whether to authenticate the requester node and to provide the requested service to the requester node. The communication history may be obtained from peer evaluator nodes which have communicated in the past with the service requester node.

FIG. 1 illustrates an example environment of a peer-to-peer network. Communication nodes 100, 102, 104 and 106 are communicably connected to network 120. While only four nodes are depicted in FIG. 1, it may be appreciated that additional nodes may reside within the example environment. As noted above, nodes 100, 102, 104 and 106 may be functionally equivalent to each other, but perform different functions based on their roles in a given service request/service provision interaction. Network 120 is not limited to a packet switched wired network but may be wireless, ad-hoc, or any number of network topographies and configurations. The network 120 may be built as a double loop topology model for peer-to-peer networks. This topology makes further improvements based on a selected peer-to-peer routing algorithm (such as Chord, or any other kind of a structured peer-to-peer routing algorithm). The nodes' communicable connection to network 120 may be wired, wireless, persistent, temporary, or any number of other connections between communication devices and networks.

One of the nodes 100 may request a service from another one of the nodes 102. The node 100 requesting a service is a service requester node (also referred to as requester node, or just service requester), and the node 102 of which the service is requested is a service provider node (also referred to as a provider node, or just service provider). The service requester may provide its communication history to the service provider, and the service provider may authenticate the service requester based on the communication history.

This communication history may include identification of other nodes 104 and/or 106 with which the requester node has communicated in the past during a predetermined time period. These other nodes 104 and/or 106 may take the role of peer nodes or evaluator nodes (also referred to as peers or evaluators). The service provider may ask the evaluator node(s) for their communication history with respect to the service requester.

One or more of the peer or evaluator nodes may store a communication history at the respective node. This communication history includes information about the requester node if they have communicated with the requester node. The communication history may also include a measure of how frequently nodes have communicated, may also include time stamps indicating a time period during which the nodes have communicated, etc. The service provider node may ask from the peer or evaluator nodes their evaluation of the requester node. The peer or evaluator nodes provide their evaluation of the requester node based on their prior experience with the requester node. The peer or evaluator nodes transmit their respective communication histories to the service provider node. The service provider node then makes a decision whether to authenticate the requester node based on the histories (and/or evaluations) provided by peer or evaluator nodes. The service provider calculates a trust measurement, or determines trustworthiness of the requester node, from these communication histories. The trust measurement is used to determine whether the service requester node will be authenticated. If the service provider determines that the requester should be authenticated, the service provider will provide the requested service to the requester. On the other hand, if it is determined that the service requester should not be authenticated, no service will be provided.

Figure 2:
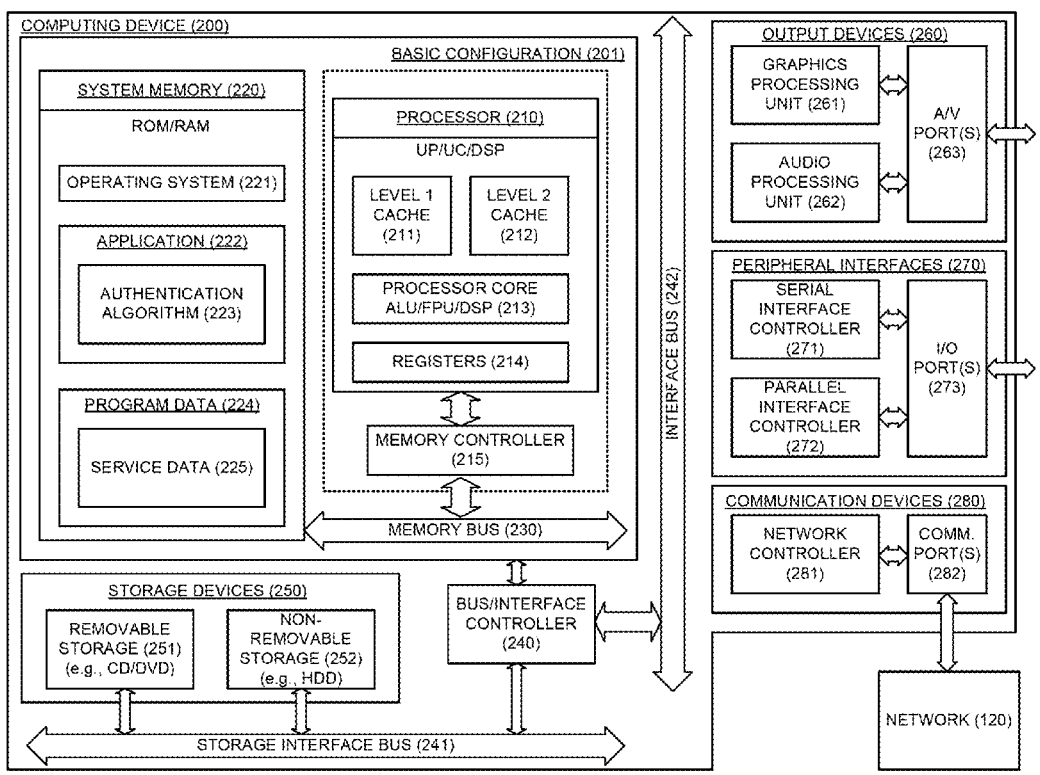
FIG. 2 illustrates an example computing device that is arranged for authentication, according to an example embodiment of the present disclosure.

FIG. 2 is a block diagram illustrating an example communication node 100 (also referred to as computing device 100 when describing an example of a possible hardware implementation) that is arranged for performing an authentication method in a peer-to-peer network in accordance with the present disclosure. It may be appreciated that nodes 100, 102, 104 and 106 may be similarly configured or may be implemented as a computing device with a different configuration while being capable of performing the roles as a service provider node, a requester node, and/or a peer or evaluator node. It may further be appreciated that nodes 100, 102, 104 and 106 may, at one time or another, perform the function of at least one of a service provider node, a requester node, and/or a peer/evaluator node. In a very basic configuration 201, computing device 100 typically includes one or more processors 210 and system memory 220. A memory bus 230 can be used for communicating between the processor 210 and the system memory 220.

Depending on the desired configuration, processor 210 can be of any type including but not limited to a microprocessor (µP), a microcontroller (µC), a digital signal processor (DSP), or any combination thereof. Processor 210 can include one more levels of caching, such as a level one cache 211 and a level two cache 212, a processor core 213, and registers 214. The processor core 213 can include an arithmetic logic unit (ALU), a floating point unit (FPU), a digital signal processing core (DSP Core), or any combination thereof. A memory controller 215 can also be used with the processor 210, or in some implementations the memory controller 215 can be an internal part of the processor 210.

Depending on the desired configuration, the system memory 220 can be of any type including but not limited to volatile memory (such as RAM), non-volatile memory (such as ROM, flash memory, etc.) or any combination thereof. System memory 220 typically includes an operating system 221, one or more applications 222, and program data 224. Application 222 includes an authentication algorithm 223 that is arranged to perform the authentication functions described earlier. Program Data 224 includes service data 225 that are used to provide services when computing device 100 functions as a service provider node. The node communication history is also stored in system memory 220 and is used by the authentication algorithm to perform authentication functions described earlier. In some embodiments, application 222 can be arranged to operate with program data 224 on an operating system 221. This described basic configuration is illustrated in FIG. 2 by those components within dashed line 201.

Computing device 200 can have additional features or functionality, and additional interfaces to facilitate communications between the basic configuration 201 and any required devices and interfaces. For example, a bus/interface controller 240 can be used to facilitate communications between the basic configuration 201 and one or more data storage devices 250 via a storage interface bus 241. The data storage devices 250 can be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 220, removable storage 251 and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media can be part of device 100.

Computing device 100 can also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which can be configured to communicate to various external devices such as a display or speakers via one or more A/V ports 263. Example peripheral interfaces 270 include a serial interface controller 271 or a parallel interface controller 272, which can be configured to communicate with external devices such as input devices (e.g., keyboard, mouse, pen, voice input device, touch input device, etc.) or other peripheral devices (e.g., printer, scanner, etc.) via one or more I/O ports 273. An example communication device 280 includes a network controller 281, which can be arranged to facilitate communications with one or more other computing devices 220 over a network communication via one or more communication ports 282. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 100 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 100 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

Figure 3:
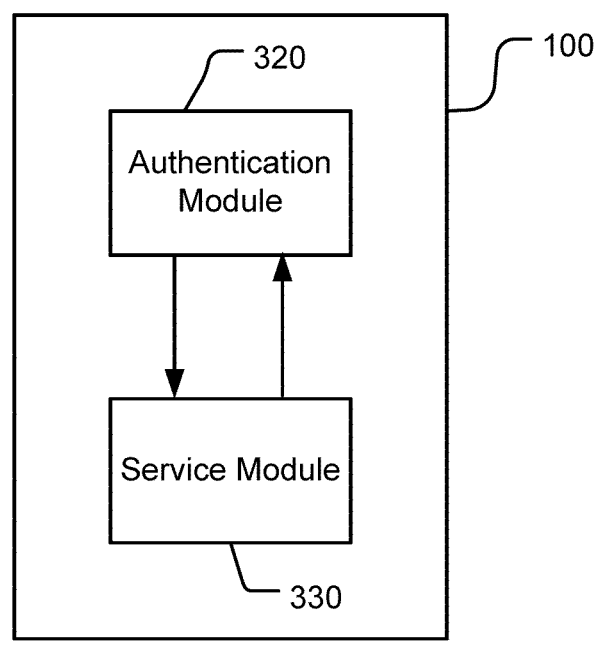
FIG. 3 is an example of a node in the peer-to-peer network, according to an example embodiment of the present disclosure.

FIG. 3 illustrates an example implementation of a node 100 participating in a peer-to-peer network. It may be appreciated that nodes 102, 104 and 106 may be similarly configured as discussed with regard to node 100. The node 100 includes service module 330 and authentication module 320. Service module 330 is configured to provide a service to a requester node. As can be appreciated by those skilled in the art, node 100 may be implemented on a variety of platforms, and is not limited to any particular implementation. Service module 330 may also be configured to receive a service provided by another apparatus. Authentication module 320 is configured to receive a request for a service from a requester node. This request for a service may include a communication history of the other nodes, identifying other nodes with which the requester node has previously communicated, and an evaluation of the other nodes by the requester node.

Figure 4:
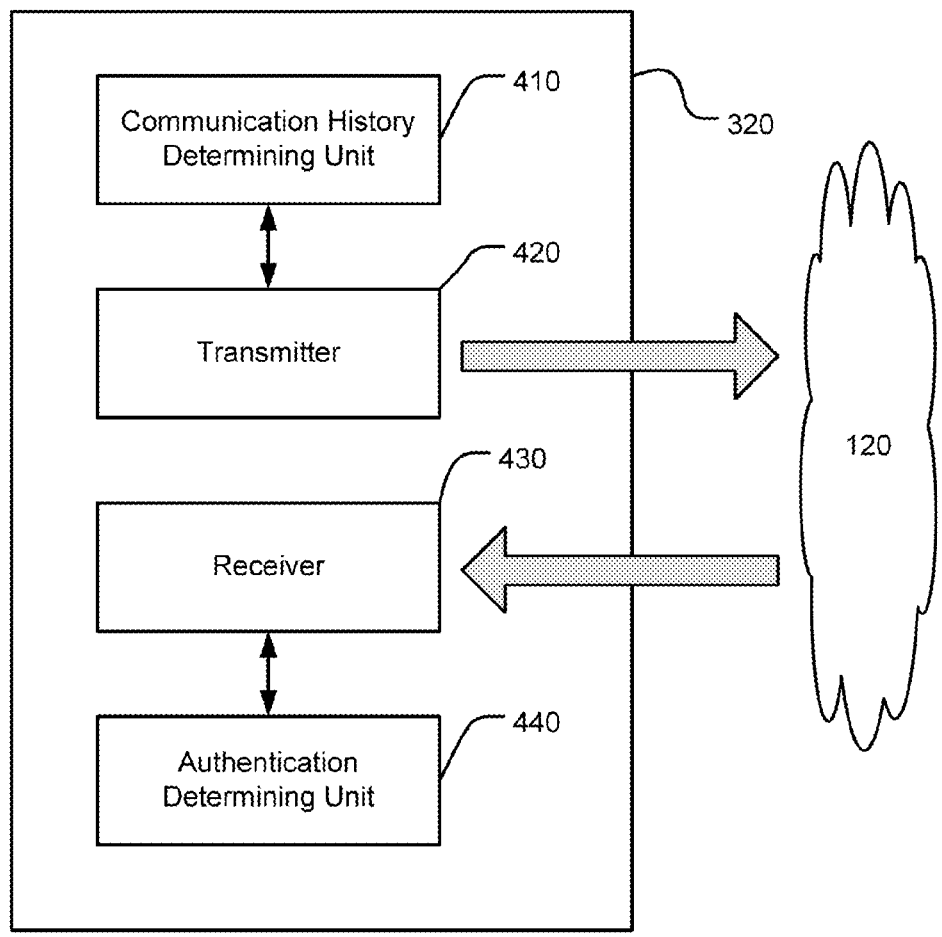
FIG. 4 illustrates functional units of an authentication module, according to an example embodiment of the present disclosure.

The authentication module 320 includes functional units illustrated in FIG. 4. The communication history determining unit 410 is configured to determine one or more other communication nodes (peer nodes) that have communicated in the past with the requester node by looking at the communication history of the requester node. When the peer nodes are identified, transmitter 420 is configured to transmit to the peer nodes a request for evaluation of the requester node. The peer nodes may return a response with an evaluation of the requester node to receiver 430 of the authentication module 320. The evaluation may be in the form of a β-list, which includes a trust value assigned to the requester node from a peer node. If a peer node has no communication history with the requester node, it may not return any evaluation of the requester node to authentication module 320. The authentication determining unit 440 determines whether to authenticate the requester node based on any evaluation that may be received from the peer nodes.

As can be appreciated, a node in the network may at times act in the role of a service provider, at other times in the role of a service requester, and yet at other times the role of a peer node. Although a node may fulfil these different roles at different times, this does not need to limit the implementation of the node based on the different roles.

Figure 5:
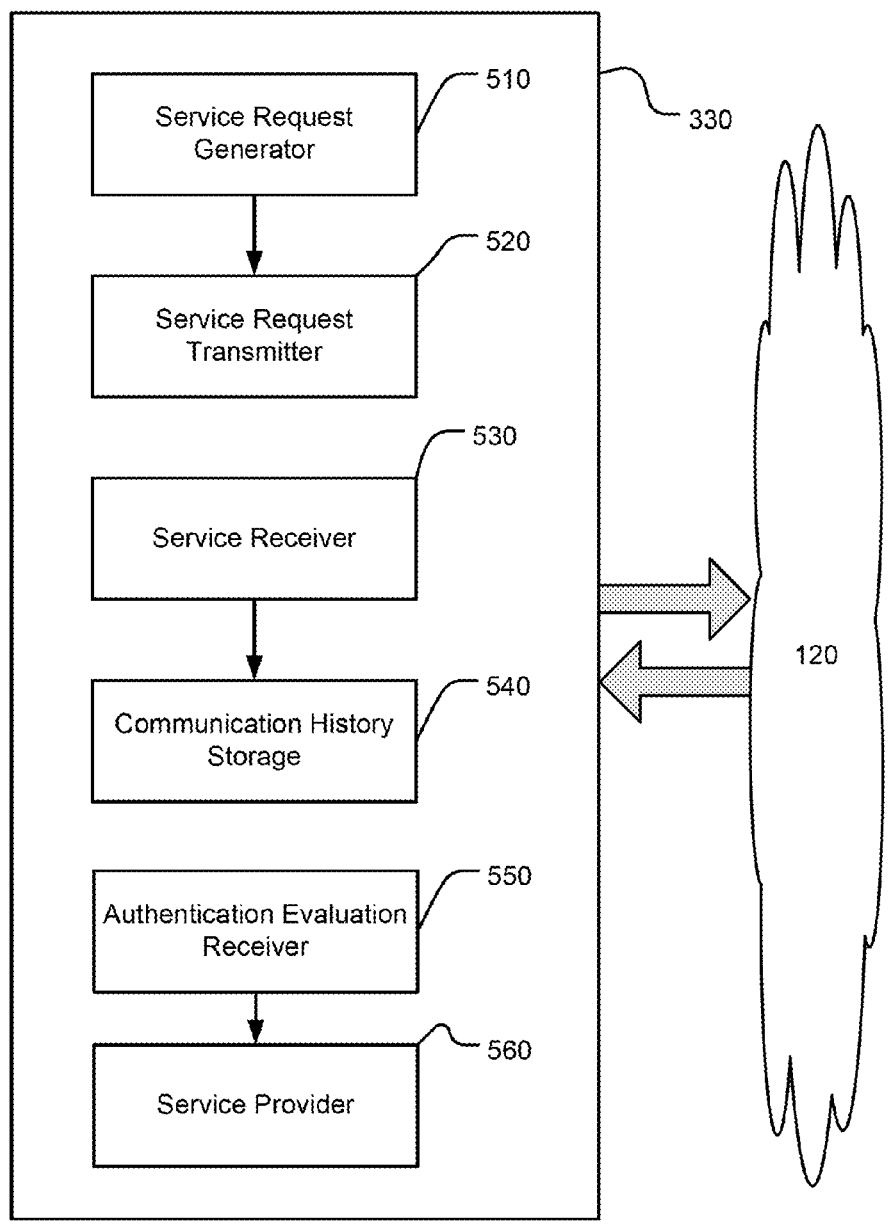
FIG. 5 illustrates functional units of a service module, according to an example embodiment of the present disclosure.

FIG. 5 illustrates functional units of a service module 330 of node 100 according to an example embodiment. Service request generator 510 is configured to generate a request for a service. This request for a service may be in response to an action of an input device, such as a device receiving input from a user. The service request generator 510 passes the request for service to service request transmitter 520. The service request transmitter 520 may transmit the generated service request to a corresponding authentication module 320 of the node 100. The service request transmitter 520 may also transmit a service request directly to another node through network 120. Service receiver 530 receives the requested service which is provided by a service provider node, when node 100 is acting as a service requester node. As illustrated in FIG. 5, the service is received through network 120. The service receiver 530 is also configured to evaluate the performance of a service provider node and record this evaluation in communication history storage 540. The service provider may also evaluate the performance of the service receiver, and record this evaluation in its communication history storage. Authentication evaluation receiver 550 receives a response from a corresponding authentication module 320 indicating whether a service requester node has been authenticated by the authentication module 320. If the service requester node has been authenticated, the authentication evaluation receiver 550 instructs service provider 560 to provide the requested service. Service provider 560 provides the actual requested service when it is instructed to do so by authentication evaluation receiver 550.

Figure 6:
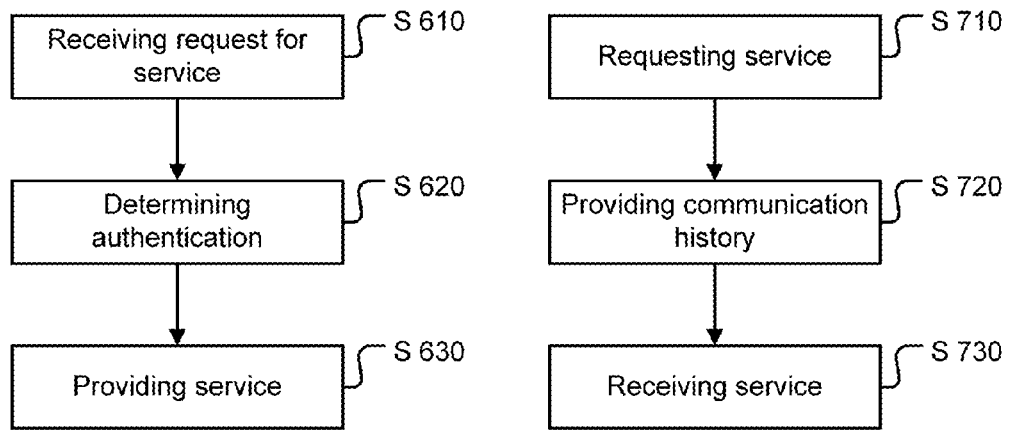
FIG. 6 is an example of process steps at a node providing a service, according to an example embodiment of the present disclosure.

FIG. 6 illustrates an example of steps that may be performed at a node acting in the role of a service provider node. In step S 610, the service provider node receives a request for a service from a service requester node. In step S 620, the service provider node determines whether the service requester node is authenticated based on a communication history of the service requester. In step S 630, the service provider node provides the requested service if it is determined that the service requester is authenticated.

Figure 7:
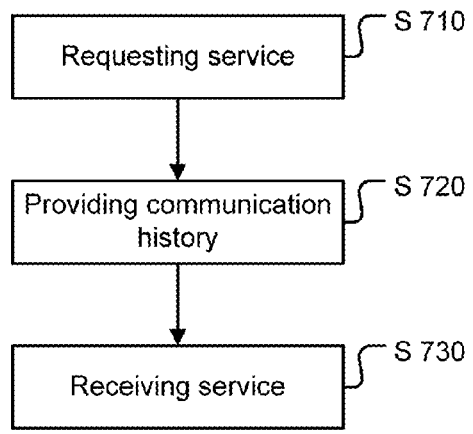
FIG. 7 is an example of process steps at a node requesting a service, according to an example embodiment of the present disclosure.

FIG. 7 illustrates an example of steps that may be performed at a node acting in the role of a service requester node. In step S 710, the service requester node requests a service. In step S 720, the service requester node provides its communication history as authentication credentials. In step S 730 the service requester node receives the requested service.

Figure 8:
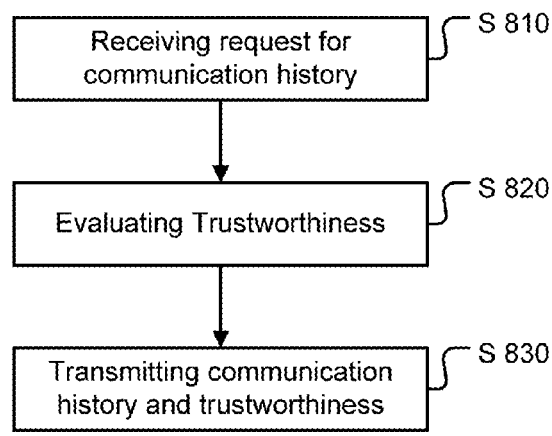
FIG. 8 is an example of process steps at a node acting as a peer evaluator node, according to an example embodiment of the present disclosure.

FIG. 8 illustrates an example of steps that may be performed a node acting in the role of a peer evaluator node. The peer evaluator node receives a request for a communication history between the peer evaluator node and a service requester node in step S 810. This request for communication history could come from a service provide node from which the service requester node has requested a service. The peer evaluator node evaluates the trustworthiness of the service requester node based on the communication history in step S 820, and transmits its own communication history including the trustworthiness evaluation of the service requester node in step S 830.

An example process flow of interaction between two nodes will be described with reference to FIG. 9. In the example disclosed in FIG. 9, node 950 is performing the role of a service requester node. The node 960 is performing the role of a service provider node. Further, service requester node 950 is designated with an identifier "i," and service provider node 960 is designated with the identifier "j." Thus, "node i" refers to the requester node 950, and "node j" refers to the service provider node 960. Both service requester 950 and service provider 960 include a corresponding service module and a corresponding authentication module (service module i and authentication module i corresponding to service requester 950, and a service module j and authentication module j corresponding to service provider 960). Steps performed in each service module and steps performed in each authentication module are distinguished from each other in FIG. 9, and designated by their relative placement within service module i, service module j, authentication module i, and authentication module j, respectively.

Figure 9:
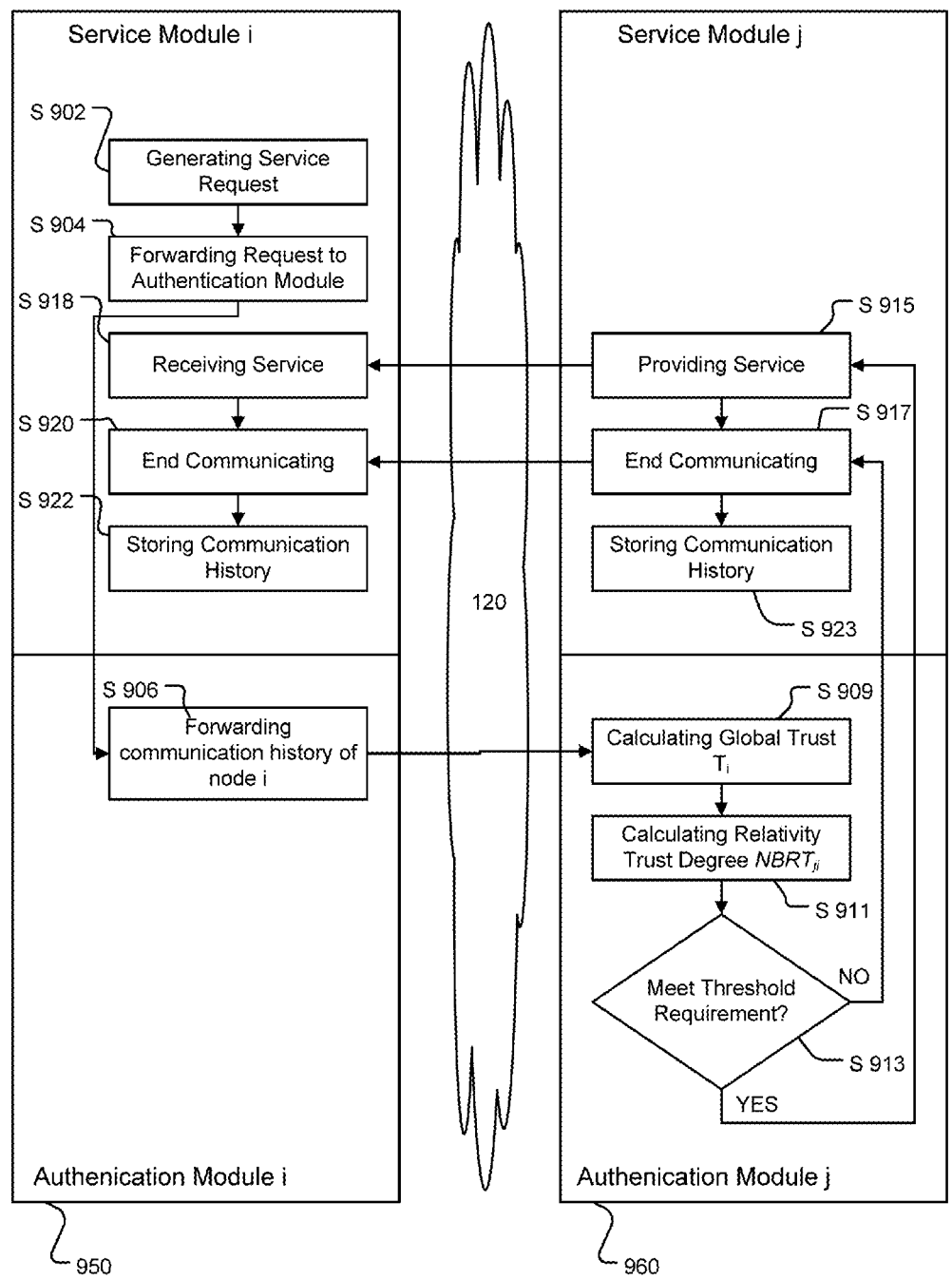
FIG. 9 is an example of a process flow between two peer nodes, according to an example embodiment of the present disclosure.

In FIG. 9, the service module i generates a service request in step S 902. Further, the service request which was generated in step S 902 is forwarded to authentication module i in step S 904. Thus, authentication module i receives a service request from service module i. Authentication module i adds to the service request the communication history of node i, and forwards the service request including the communication history to node j in step S 906. As can be appreciated, the service request could also be sent to service provider 960 from service module i rather than just authentication module i. Indeed, service requester node 950 could transmit a service request to service provider node 960 in a number of ways which are not limited to the example embodiment of FIG. 9.

The communication history may be limited to and thus span a predetermined time period, such as the last hour, 2 hours, 3 hours etc. This predetermined period of time accounts for possible changes of behavior patterns of a given node in the peer-to-peer network. Thus, a node which is considered trustworthy at one point in time may change its behavior and no longer be considered trustworthy at a later period of time. Conversely, a node which is considered not trustworthy at some point in time, may through its behavior and updated evaluations given by its peers become trustworthy. The time period selection enables using evaluations that are not stale. Further, the communication history may include an evaluation of the other nodes. The evaluation may be a qualitative impression of the other nodes' behavior. A user or owner of a node may, for example, assign an evaluation to another node by for example, using a sliding bar, entering a number, or other types of user interfaces, as is appreciated by one skilled in the art. The evaluation may also be a quantitative number of successful and failed communication attempts with other nodes. For example, the evaluation may include a count of successful and failed communication attempts between two nodes.

At node j, authentication module j receives the request from authentication module i. However, service provider 960 is not limited to receiving the request only through authentication module i, but could receive it through other modules which are not illustrated in this example. In step S 909, authentication module j calculates a global trust ($T_i$) of node i. As a part of calculating a global trust, node j will request an evaluation of node i from peer nodes with which node i has communicated in the past. The identification of these peer nodes is included in the communication history forwarded to authentication module j in step S 906. The peer nodes provide their own communication histories to node j, which are used by the authentication module j to calculate the global trust.

Further, authentication module j calculates the relative trust degree $NBRT_{ji}$, of node i in step S 911. The output of step S 911 may be a value which represents the relative trust degree. This value is then compared to a predetermined threshold in step S 913. The predetermined threshold may be set individually for every node in the peer-to-peer network, or the predetermined threshold could also be set globally to be equal among all nodes in the peer-to-peer network. If the value output in step S 911 meets a predetermined threshold, authentication module j indicates to service module j that node i is authenticated. Thus, in step S 915, service module j provides the requested service to service module i. Service module i receives the provided service in step S 918. After the service has been provided, the communication between service module j and the service module i ends as indicated in steps S 917 and S 920. After the communication ends, service module j stores an evaluation of the interaction with node i as part of the communication history of node j in step S 923. Thus, the communication history of node j is updated based on the most recent interaction with node i. Service module i also stores an evaluation of the interaction with node j as part of the communication history of node i in step S 922. As can be appreciated, the communication history of each node can be stored in a memory on the respective node.

If the threshold requirement is not met in step S 913, authentication module j indicates to service module j that node i is not authenticated, and that no service should be provided. In turn, service module j does not provide a service to service module i, but instead ends communication in step S 917. Service module j may also inform service module i that no service will be provided, and service module i in turn ends communication in step S 920. Even if no service is provided by service module j, service module j may store a record or an evaluation of the interaction with node i in its communication history in step S 923. Service module i may also store a record or an evaluation of this interaction with node j as part of the communication history of node i, in step S 922.

It is possible, that a problem in the underlying communication channel causes a long delay in the communication between node i and j. It this case, node i and node j may not need to record feedback. On the other hand, if communication is already initiated and between nodes i and j, and is terminated suddenly during a normal session, the system may automatically generate a feedback indicating a failure.

In an embodiment, it is possible for a user of node i and a user of node j to determine what feedback should be given, and assign that feedback. For example, a user could be prompted to choose between a "success" button and a "failure" button, to express the user's assessment of the communication session. Alternatively, a numeric value may be provided and stored as the user's assessment of the communication session. This assessment could then be assigned as feedback to a node.

Communication history may be stored in each node, and transmitted to other nodes, as a list format in storage data structures as defined below. The following definitions of symbols and variables are used in the data structures. $S_{ij}$ represents the count of successful communications or transactions between node i and node j. $F_{ij}$ represents the count of unsuccessful or failed communications or transactions between node i and node j. $I_{all}$ represents the collection of all nodes in P2P network. $I_2$ represents the collection of all nodes which have communicated with node i. $I_{ij}=I_i \cap I_j$, that is nodes which have communicated with both node i and node j. $TS_{ij}=S_{ij}/(S_{ij}+F_{ij})$, whose value range may be [0, 1], represents the rate of successful communication between nodes i and j, which is called positive trust degree valuation of j given by i. $TF_{ij}=(-1) \times F_{ij}/(S_{ij}+F_{ij})$, whose value range is [−1, 0], which is called negative trust degree valuation of j given by i. Local trust degree between nodes $T_{ij}$ represents the trust degree of node j from an individual view of node i, namely the local trust degree valuation of j given by node i, $T_{ij}=TS_{ij}+TF_{ij}$, whose value range is [−1, 1].

Figure 10:
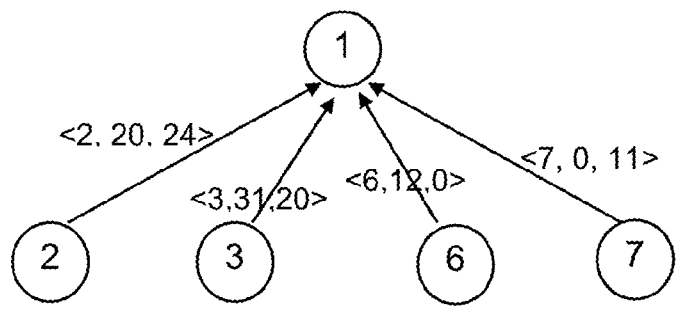
FIG. 10 is an example of an $\alpha$-list data structure, according to an example embodiment of the present disclosure.

An α-list(i)={<j, $S_{ij}$, $F_{ij}$>|j∈$I_i$} and represents a collection of variables <j, $S_{ij}$, $F_{ij}$>, in which every single element records the number of successful and unsuccessful communications between the node i and node j. Each node could maintain an α-list list. For example, node number 1 only stores the communication history of the nodes having communicated with node number 1. FIG. 10 illustrates an example of α-list(1) that is an α-list stored on node number 1. In FIG. 10 node 1 has communicated with nodes numbered 2, 3, 6, and 7. Node number 2 and node number 3 have communicated with node number 1 more than other nodes have, and the count of successful communications between node number 3 and node number 1 is bigger than the count of successful communications between node number 2 and node number 1, yet the number of failed communications between node number 2 and node number 1 is greater than between node number 3 and node number 1. The successful communication rate between node number 6 and node number 1 is 100%, and the successful communication rate between node number 7 and node number 1 is 0%. It may be appreciated that nodes 1, 2, 3, 6 and 7 may be implemented as one of the nodes residing with the system environment as discussed above.

The α-list may also include the frequency of communication between nodes and a timestamp of the communication. Thus an α-list could be defined as α-list(i)={<j, $S_{ij}$, $F_{ij}$, Fre, timeStamp >|j∈$I_i$}, wherein Fre stands for frequency of communication between i and j, and timeStamp is the time stamp of the communication.

A β-list is used to store the local trust degree between nodes, which is a result of a calculation based on the α-list. β-list(i) may be a collection of duality variables which includes the nodes having communicated with node i and an evaluation of local trust degree given by node i to those nodes. A β-list is defined as β-list(i)={<j, $T_{ij}$>|j∈$I_i$}.

In the case where the α-list includes frequency of communication and a timestamp, the communication frequency can be used directly as a factor of local trust degree, and the time stamp can be used as a filtering parameter for calculating trust degree in a certain time duration. Thus, a β-list would be defined as β-list(i)={<j, Fre*$T_{ij}$>|j∈$I_i$}$_{[time1 time2]}$, which is local trust degree collection between time1 and time2.

Figure 11:
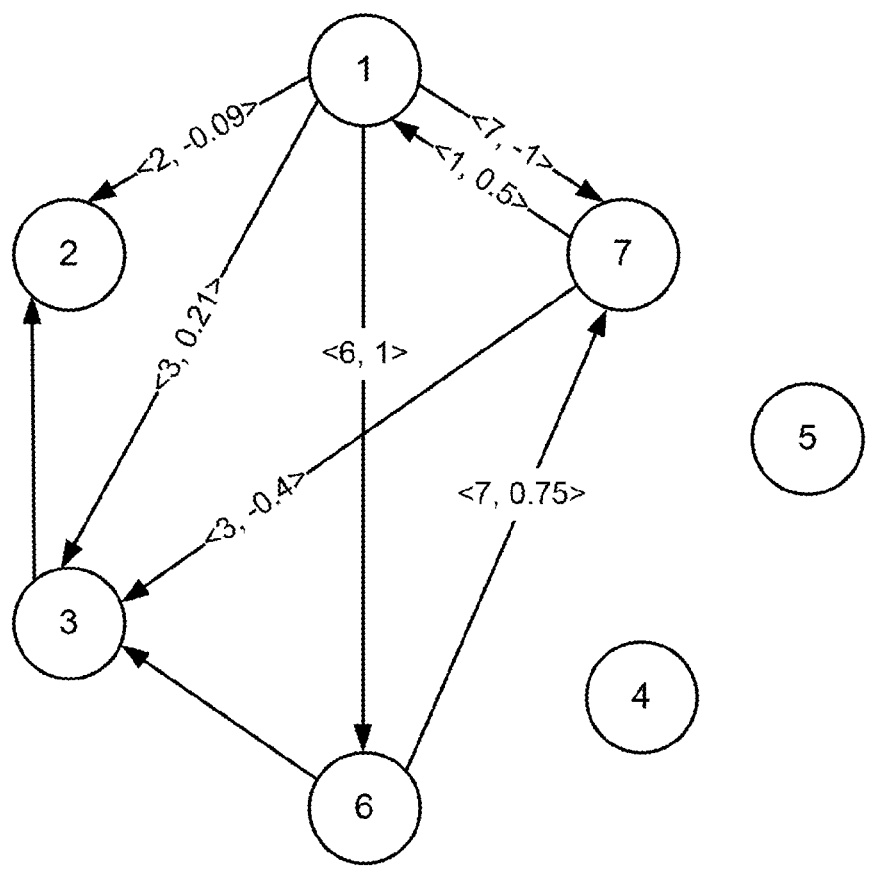
FIG. 11 is an example of a $\beta$-list data structure, according to an example embodiment of the present disclosure.

FIG. 11 illustrates an example of a β-list, wherein the arrow between the numbered nodes represents the visit relationship, and the value on the arrow represents the value of corresponding duality variable between the two nodes. It may be appreciated that nodes 1-7 may be implemented as one of the nodes residing within the system environment as discussed above. In the example of FIG. 11, β-list(7)={<1,0.5>,<3,−0.4>} represents the valuation of local trust degree given by node number 7 for node number 1 is 0.5, while the local trust degree valuation given by node number 7 for node number 3 is −0.4. The valuations of local trust given by node 1 illustrated in FIG. 11 are based on the α-list illustrated in FIG. 10. Thus, in this example the β-list(1)={<2, −0.09>, <3, 0.21>, <6, 1>, <7, −1>}.

The communication history represented by the αlist can be recorded both at the service provider as well as at the service receiver. Thus, the communication history can be a mutual record between nodes i and j. For example, when node i communicates with node j, and node j provides a service to node i, node i may send its own evaluation of node j to node j, and also store the evaluation in its communication history at the same time.

Details of the calculations performed by the authentication module will now be described. A global trust degree can be defined and obtained according to β-list. The global trust degree of node i represents the integrated value of the trust degree valuations from all the nodes having communicated with node i. $T_i$ is used to represent the global trust degree of node i. The averaging method is applied to calculate the global trust degree in this article, and the formula is shown as below.

$$T_i = \Sigma_{c \in I_i} T_{ci}/n, \text{ n is the total number of the nodes in } I_i \quad \text{[Equation 1.]}$$

As can be understood from the example of alpha list and beta list where frequency of communication and timestamps are stored, the global trust can also be calculated as $T_i = \Sigma_{d \in I}^{Fre \times Tci}/n$, wherein n is total number of nodes in $I_i$ and Fre is frequency of communication between i and j. If considering time as well, the equation can be changed to $T_i(time1:time2) = \Sigma_{c \in I}^{Tci}/n$, wherein n is total number of nodes satisfying time requirement from time1 to time2 in $I_i$, at this time what is calculated is global trust degree from time1 to time2.

A trust degree matrix R is a n×n matrix converted from local trust degree β-list among nodes, in which n is the total number of all nodes. In the matrix each element $r_{ij}$ is defined as below:

$$r_{ij} = \begin{cases} T_{ij}, & \text{if communication histroy exists between } i \text{ and } j \\ \varepsilon, & \text{if communication histroy does not exists between } i \text{ and } j \\ 1, & \text{on the condition that } i = j \end{cases} \quad \text{[Equation 2.]}$$

If communication history does not exist between node i and node j, the corresponding $r_{ij}$ is set to ε (non-zero minimum value), and the self-valuation of node is set to 1. A matrix R is shown below.

$$R = (r_{ij})_{n \times n} = \begin{bmatrix} R_{11} & R_{12} & \ldots & R_{1n} \\ R_{21} & R_{22} & \ldots & R_{2n} \\ \ldots & \ldots & \ldots & \ldots \\ R_{n1} & R_{n2} & \ldots & R_{nn} \end{bmatrix}$$

The Pearson Correlation Coefficient (PCC) method may be adopted to calculate the relativity or similarity between node i and node j. According to the PCC formula, $\overline{R_i}$ $$\overline{R_i} = \frac{\sum_{c \in I_{ij}} T_{ic}}{n},$$

n is the count of nodes in $I_{ij}$.) represents an average valuation of all nodes in $I_{ij}$ given by node i. The formula for calculating the relativity between node i and node j is expressed as:

$$sim(i, j) = \left| \frac{\sum_{c \in I_{ij}} (T_{ic} - \overline{R}_1)(T_{jc} - \overline{R}_j)}{\sqrt{\sum_{c \in I_{ij}} (T_{ic} - \overline{R}_1)^2} \sqrt{\sum_{c \in I_{ij}} (T_{jc} - \overline{R}_j)^2}} \right| \quad \text{[Equation 3.]}$$

As can be appreciated from equation 3, a larger result of the relativity calculations indicates a higher degree of relativity or similarity between nodes i and j. Equation 3 takes into account biases that nodes may have by subtracting the average valuation of all nodes given by node i out of the particular evaluation of node c as given by node i. Likewise, the bias that node j may have is also taken into account. Thus, the similarity or relativity indicates whether node i and node j tend to evaluate the nodes they have both communicated with in the same manner, or in the opposite manner.

Relative trust degree $NBRT_{ij}$ is the product of the global trust degree of node j and the relativity between i and j. Meanwhile, the global trust degree $T_j$ is normalized, i.e. the relativity is set to 0 if the value of $T_j$ is less than 0; otherwise, the relative trust degree is the product of the two variables.

$$NBRT_{ij} = \begin{cases} 0 & (T_j <= 0) \\ sim(i, j) \bullet T_j & (T_j > 0) \end{cases} \quad \text{[Equation 4.]}$$

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An authentication method, comprising:

receiving, at a first node, a request for a service from a second node, the request for the service including a communication history of the second node, the first node and the second node each including a computing device;

determining one or more other communication nodes belonging to the communication history of the second node;

transmitting, to the one or more other nodes, a request for evaluation of the second node;

receiving, from the one or more other nodes, an evaluation of the second node in response to the request for evaluation, the evaluation based on the one or more other nodes' prior experience with the second node;

determining whether to authenticate the second node based on the evaluation received from the one or more other nodes, the determining whether to authenticate including:

calculating a global trust degree ($T_j$) of the second node as a weighted average of evaluations of the second node by the one or more other communication nodes;

calculating a relative trust degree ($NBRT_{ij}$) based on the global trust degree ($T_j$) and a similarity of the first node and the second node (sim (ij)), the relative trust degree ($NBRT_{ij}$) being based on the formula $$NBRT_{ij} = \begin{cases} 0 & (T_j <= 0) \\ sim(i, j) \times T_j & (T_j > 0); \end{cases}$$

and comparing the relative trust degree to a predetermined threshold; and providing the service to the second node when the determining whether to authenticate indicates that the second node is authenticated.

2. The authentication method as recited in claim 1, wherein the similarity of the first node and the second node (sim (ij)) is calculated according to the formula:

$$sim(i, j) = \left| \frac{\sum_{c \in I_{ij}} (T_{ic} - \overline{R}_i)(T_{jc} - \overline{R}_j)}{\sqrt{\sum_{c \in I_{ij}} (T_{ic} - \overline{R}_i)^2} \sqrt{\sum_{c \in I_{ij}} (T_{jc} - \overline{R}_j)^2}} \right|$$

wherein $I_{ij}$ is a set of common nodes that are present both in a communication history of first node and the communication history of the second node, $T_{ic}$ is a trust evaluation of node c by the first node, $T_{jc}$ is a trust evaluation of node c by the second node, $\overline{R}_i$ is normalized average evaluation given by the first node to nodes in the communication history of the first node, and $\overline{R}_j$ is a normalized average trust evaluation given by the second node to nodes in the communication history of the second node.

3. The authentication method as recited in claim 1, further comprising:

providing an evaluation of the second node by the first node; and storing the evaluation as communication history at the first node.

4. An authentication method of a first node requesting a service from a second node, the method comprising:

requesting the service from the second node, including providing as authentication credentials a communication history of the first node identifying one or more other nodes with which the first node had previously communicated, the first node and the second node each including a computing device; and receiving the service from the second node based on:

a global trust degree ($T_j$) of the first node as a weighted average of evaluations of the first node by the one or more other nodes;

a relative trust degree ($NBRT_{ij}$) based on the global trust degree ($T_j$) and a similarity of the second node and the first node (sim (ij)), the relative trust degree ($NBRT_{ij}$) being based on the formula $$NBRT_{ij} = \begin{cases} 0 & (T_j <= 0) \\ sim(i, j) \times T_j & (T_j > 0); \end{cases}$$

and a comparison of the relative trust degree to a predetermined threshold.

5. The authentication method as recited in claim 4, wherein the requesting includes:

generating a request for the service in a service module of the first node;

providing the request for the service from the service module to an authentication module of the first node; and adding to the request for the service the communication history of the first node.

6. The authentication method as recited in claim 4, further comprising:

evaluating the second node based on the received service; and updating the communication history of the first node based on the evaluating.

7. An apparatus, comprising:

a processor;

a computer-readable storage medium having computer instructions stored thereon that are executable by the processor to perform operations comprising:

receiving a request for a service including a communication history of a requester apparatus, the communication history including information associated with communication between the requester apparatus and one or more other communication apparatuses with which the requester apparatus has previously communicated;

authenticating the requester apparatus based on one or more evaluations of the requester apparatus by the one or more other communication apparatuses identified from the communication history, the authenticating including:
calculating a global trust degree ($T_j$) of the requester apparatus as a weighted average of the one or more evaluations of the requester apparatus;
calculating a relative trust degree ($NBRT_{ij}$) based on the global trust degree ($T_j$) and a similarity of the apparatus and the requester apparatus; and
comparing the relative trust degree to a predetermined threshold; and providing the service to the requester apparatus based on the authentication.

8. The apparatus as recited in claim 7, further comprising:
a transmitter configured to transmit to the one or more other communication apparatuses a request for evaluation of the requester apparatus; and
a receiver configured to receive from the one or more other communication apparatuses an evaluation of the requester apparatus in response to the request for evaluation.

9. The apparatus as recited in claim 7, wherein the relative trust degree ($NBRT_{ij}$) is based on the equation:

$$NBRT_{ij} = \begin{cases} 0 & (T_j <= 0) \\ sim(i, j) \times T_j & (T_j > 0) \end{cases}$$

wherein
sim (i,j) is the similarity of the apparatus and the requester apparatus.

10. The apparatus as recited in claim 7, wherein the operations further comprise calculating the similarity of the apparatus and the requester apparatus based on the equation:

$$sim(i, j) = \left| \frac{\sum_{c \in I_{ij}} (T_{ic} - \overline{R}_i)(T_{jc} - \overline{R}_j)}{\sqrt{\sum_{c \in I_{ij}} (T_{ic} - \overline{R}_i)^2} \sqrt{\sum_{c \in I_{ij}} (T_{jc} - \overline{R}_j)^2}} \right|$$

wherein $I_{ij}$ is a set of common apparatuses that are present both in a communication history of the apparatus and the communication history of the requester apparatus, $T_{ic}$ is a trust evaluation of apparatus c by the apparatus,
$T_{jc}$ is a trust evaluation of apparatus c by the requester apparatus,
$\overline{R}_i$ is normalized average evaluation given by the apparatus to other apparatuses in the communication history of the apparatus, and
$\overline{R}_j$ is a normalized average trust evaluation given by the requester apparatus to apparatuses in the communication history of the requester apparatus.

11. The apparatus as recited in claim 7, wherein the operations further comprise:
generating a service request;
adding to the service request a communication history of the apparatus; and
directing transmission of the service request to an authentication module of another apparatus.

12. The apparatus as recited in claim 11, wherein the operations further comprise:
receiving a requested service from the another apparatus and evaluating the another apparatus based on receiving the requested service.

13. The apparatus as recited in claim 7, wherein the operations further comprise:
receiving, from an authentication requester apparatus, a request for a communication history between the apparatus and another apparatus;
calculating a trust metric of the another apparatus based on the communication history between the apparatus and the another apparatus; and
transmitting, to the authentication requester apparatus, the communication history between the apparatus and the another apparatus including the trust metric.

14. The apparatus as recited in claim 13, wherein:
the trust metric ($T_{ij}$) is calculated based on the equation $T_{ij}=TS_{ij}+TF_{ij}$, where $TS_{ij}=S_{ij}/(S_{ij}+F_{ij})$ $TF_{ij}=(-1) \times F_{ij}/(S_{ij}+F_{ij})$, $S_{ij}$ is a count of successful communications between the apparatus and the another apparatus, and
$F_{ij}$ is a count of failed communications between the apparatus and the another apparatus.

\* \* \* \* \*

UNITED STATES PATENT AND TRADEMARK OFFICE
CERTIFICATE OF CORRECTION

Page 1 of 1

PATENT NO. : 8,756,658 B2
APPLICATION NO. : 12/813724
DATED : June 17, 2014
INVENTOR(S) : Tan It is certified that error appears in the above-identified patent and that said Letters Patent is hereby corrected as shown below:

In the Specification

In Column 9, Line 46, delete "$I_2$" and insert -- $I_i$ --, therefor.

In Column 11, Line 1, delete "$T_i = \Sigma_{d \in I} {}^{Fre \times T_{ci}}/n$," and insert -- $T_i = \Sigma_{c \in I_i} Fre \times T_{ci} / n$, --, therefor.

In Column 11, Line 4, delete "$\Sigma_{c \in I} T_{ci}/n$," and insert -- $\Sigma_{c \in I_i} T_{ci} / n$, --, therefor.

In the Claims

In Column 16, Line 37, in Claim 14, delete "$F_{ij}$)" and insert -- $F_{ij}$), --, therefor.

Signed and Sealed this
Twenty-eighth Day of October, 2014

Michelle K. Lee
*Deputy Director of the United States Patent and Trademark Office*